J. P. DORAU.
GEARING FOR WASHING MACHINES.
APPLICATION FILED NOV. 30, 1914.
1,172,264.
Patented Feb. 22, 1916.
2 SHEETS—SHEET 1.
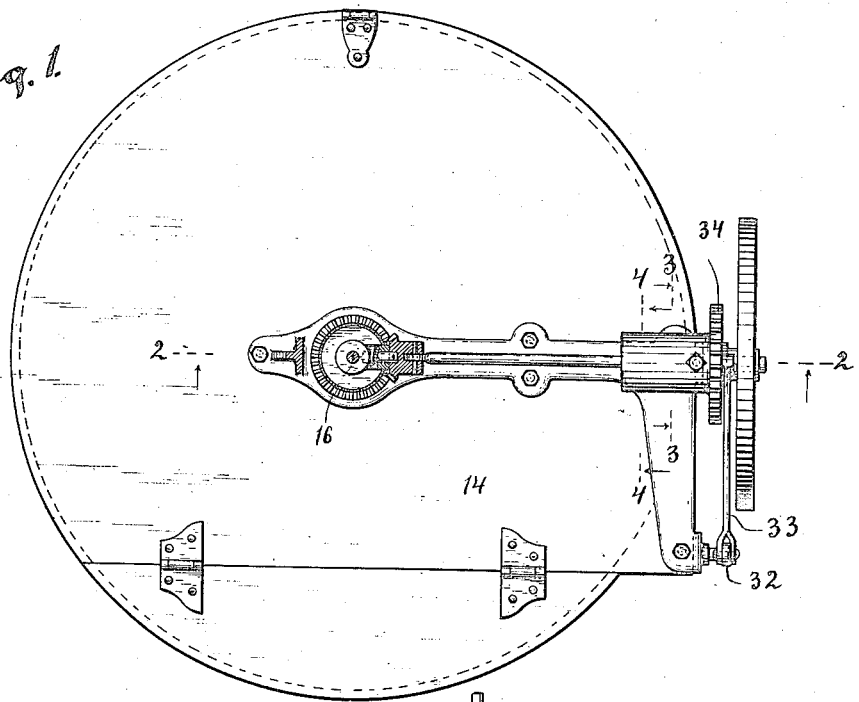
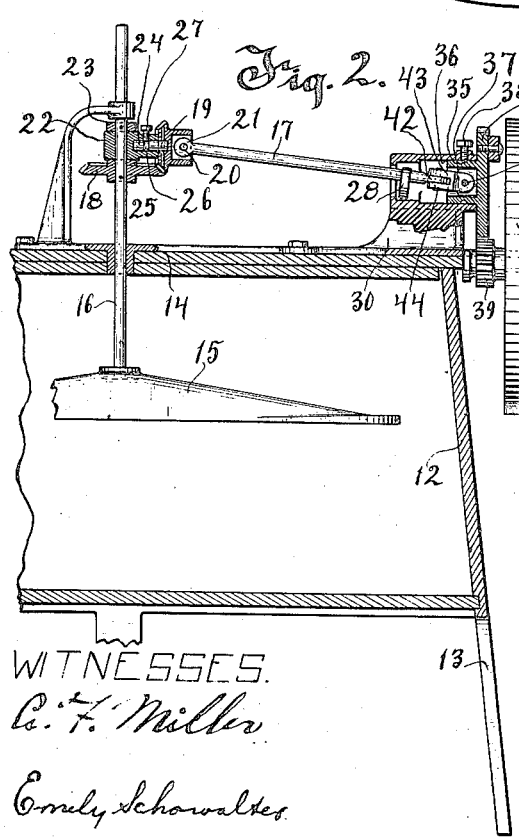
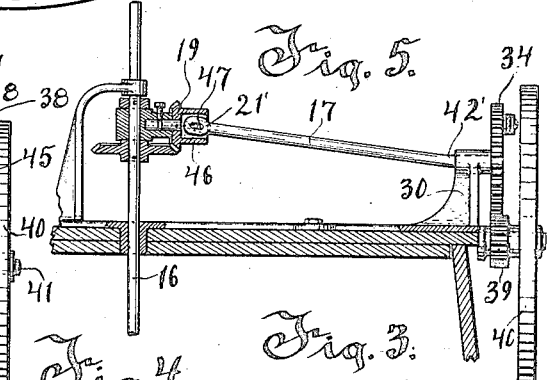
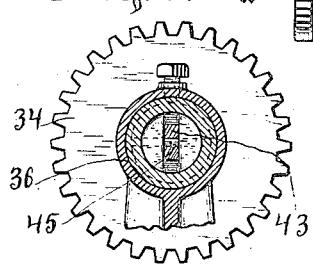
WITNESSES.
C. F. Miller
Emily Schowalter
INVENTOR
John P. Doran
Morsell, Keeney & French
ATTORNEYS.

J. P. DORAU.
GEARING FOR WASHING MACHINES.
APPLICATION FILED NOV. 30, 1914.
1,172,264.
Patented Feb. 22, 1916.
2 SHEETS—SHEET 2.
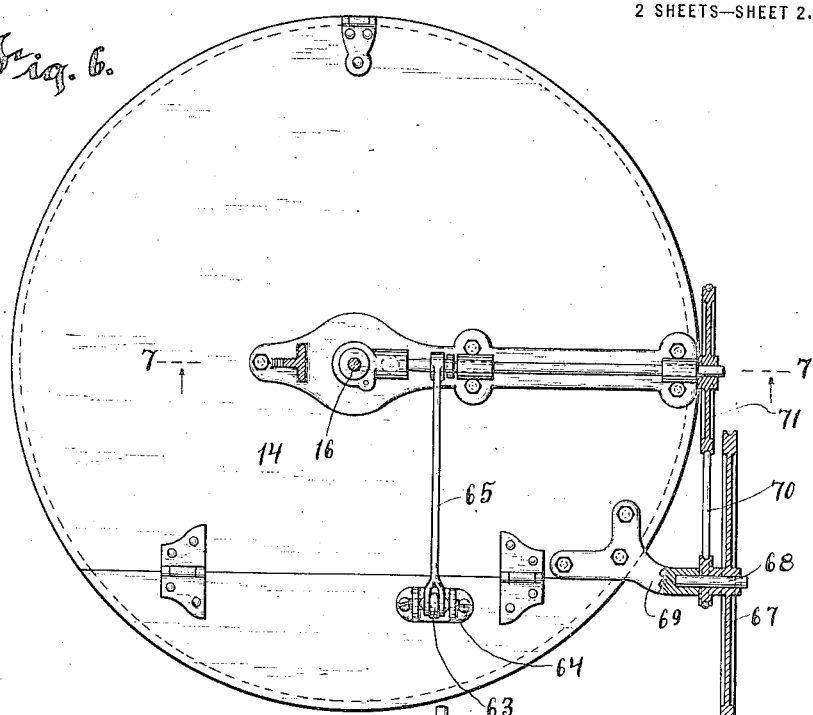
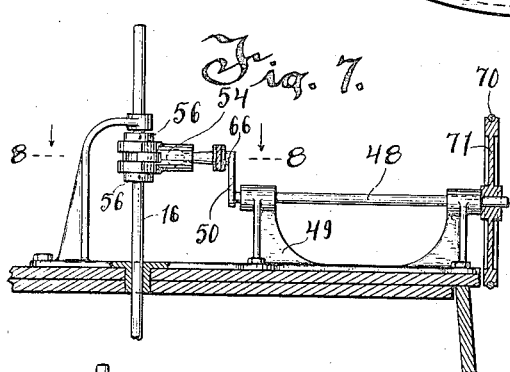
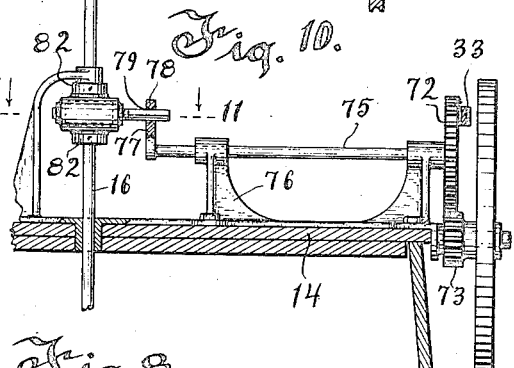
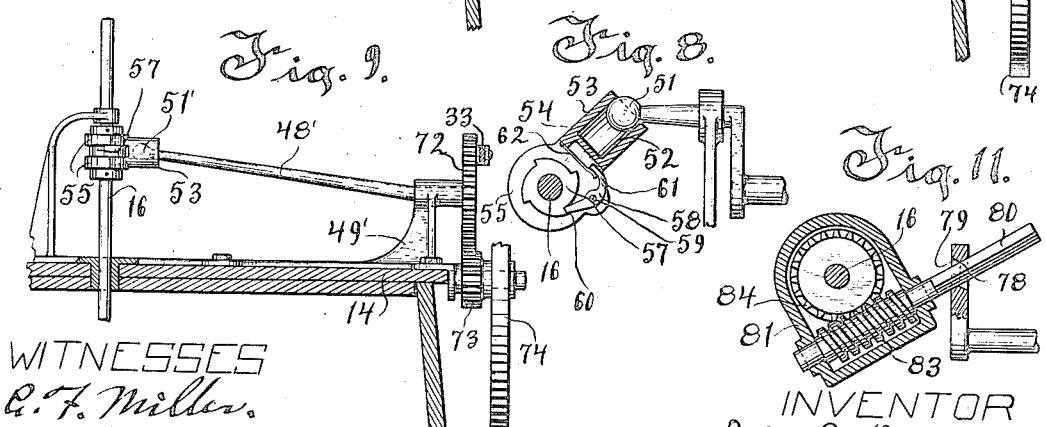
WITNESSES
C. F. Miller.
Emily Schowalter.
INVENTOR
John P. Dorau
Mosell, Keeney & French
ATTORNEYS.

UNITED STATES PATENT OFFICE.

JOHN P. DORAU, OF JEFFERSON, WISCONSIN.

GEARING FOR WASHING-MACHINES.

1,172,264.   Specification of Letters Patent.   Patented Feb. 22, 1916.

Application filed November 30, 1914.   Serial No. 874,575.

*To all whom it may concern:*

Be it known that I, JOHN P. DORAU, a citizen of the United States, and resident of Jefferson, county of Jefferson, and State of Wisconsin, have invented new and useful Improvements in Gearing for Washing-Machines, of which the following is a description, reference being had to the accompanying drawings, which are a part of this specification.

The invention relates to gearing for washing machines.

The invention designs more particularly to provide a washing machine in which the means for agitating the contents within the receptacle of the machine is vertically reciprocated and continuously rotated.

The invention further designs to provide a washing machine having a pivoted cover with a driving mechanism for the agitator mounted upon said cover and a fly-wheel comprising part of the means for operating the agitator mounted upon the cover, said fly-wheel having its axis coincident with the axis of the pivotal connection of the cover and the machine whereby the cover will be relieved of the weight of the fly-wheel when it is raised.

The invention consists in the several features hereinafter set forth and more particularly defined by claims at the conclusion hereof.

In the drawings Figure 1 is a plan view of the device embodying the invention, parts being shown in section; Fig. 2 is a section taken on line 2—2 of Fig. 1; Fig. 3 is a section taken on line 3—3 of Fig. 2; Fig. 4 is a section taken on line 4—4 of Fig. 2; Fig. 5 is a view similar to Fig. 2, showing a modified form thereof; Fig. 6 is a view similar to Fig. 1, showing a modified form thereof; Fig. 7 is a section taken on line 7—7 of Fig. 6; Fig. 8 is a section taken on line 8—8 of Fig. 7; Fig. 9 is a view similar to Fig. 7, showing a modified form thereof; Fig. 10 is a view similar to Fig. 7, showing another modified form; Fig. 11 is a section taken on line 11—11 of Fig. 10.

The machine comprises a tub or receptacle 12 provided with supporting legs 13, a hinged cover 14, an agitator 15 secured to a vertical shaft 16 which is pivotally secured in the cover and means for vertically reciprocating and continuously rotating said shaft.

The means for vertically reciprocating and continuously rotating the shaft 16 shown in Figs. 1 to 4 comprises a shaft 17 disposed at an angle to the shaft 16, a driving connection between the shafts 16 and 17, means for elevating and depressing said shaft 17, and means for continuously rotating said shaft 17. The driving connection between the shafts 16 and 17 comprises a bevel gear 18 which is secured to the shaft 16 and a bevel gear 19 in mesh with said gear 18 which is pivotally secured by a pin 20 to the end 21 of the shaft 17. The gear 19 is held in mesh with the gear 18 by a block 22 which is pivotally mounted upon a shaft 16 between the bevel gear 18 and a collar 23 secured to the shaft 16, said block having a recess 24 therein for receiving a pin 25 which is secured to the gear 19 and is revoluble within the aperture 24 of the block 22, and a groove 26 to receive the end of a set screw 27 secured in the block 22. Resultantly the pin 25 being rigidly secured to the gear 19 and revolubly mounted in the block 22, and the block 22 being pivotally secured to the shaft 16, the gears 18 and 19 will be continuously in mesh with each other and form a driving connection between the shafts 16 and 17.

The means for elevating and depressing the shaft 17 so as to vertically reciprocate the shaft 16 comprises a cam 28 secured to the shaft 17 and movable within an aperture 29 in a supporting bracket 30, the shaft 17 being movable within a vertical slot 31 in the bracket 30 adjacent the cam 28. Resultantly the rotation of the shaft 17 will cause the cam 28 secured thereto to move said shaft up and down within the slot 31.

The means for continuously rotating the shaft 17 comprises an operating lever 32 pivotally secured to a cover of the machine, a link 33 pivotally secured to one end of said lever 32 intermediate the end thereof and pivotally and eccentrically secured to a gear 34 having a hub 35 revolubly mounted within a bearing 36 in the bracket 30 and provided with an annular groove 37 to receive the end of a set screw 38 secured to the bracket 30 to prevent endwise movement of the hub 35. A gear 34 is in mesh with a gear 39 integral with the hub of the fly-wheel 40 which is mounted upon a shaft 41 secured to the cover of the machine. The end 42 of the shaft 17 is operatively secured to the gear 34 by a link 43 which is pivotally secured to the end 42 of the shaft 17 by a pin 42 and which is also secured to the hub 35 by a pin 45, the pin 45 being disposed at an angle to the pin 44 to form a universal connection between the shaft 17 and the gear 34.

The means for vertically reciprocating and continuously rotating the shaft 16 shown in Fig. 5 is similar to that shown in Fig. 2 with the exception of the means for elevating and depressing the shaft 17 and for continuously rotating the same. To accomplish the elevation and depression of the shaft 17 to vertically reciprocate the shaft 16, the end 21' of the shaft 17 is provided with a slot 46 in which a pin 47 secured to the gear 19 is slidably mounted and the shaft 17 is journaled in the supporting bracket 30 and is bent at its end 42' and secured directly to the gear 34. Resultantly the rotation of the gear 34 will rotate the shaft 17 and its end 21 being bent at an angle to the end 42' and secured to the gear 19 will cause said gear to move up and down and consequently raise and lower the shaft 16 to which said gear is operatively connected.

The means for vertically reciprocating and continuously rotating the shaft 16 shown in Figs. 6 to 8 comprises a horizontal shaft 48 which is journaled in suitable bearings in a bracket 49 secured to the cover 14 of the machine, a driving connection between said horizontal and vertical shafts which provides a means for continuously rotating and vertically reciprocating the shaft 16 and means for operating said horizontal shaft.

The driving connection between the shaft 48 and the shaft 16 comprises a crank 50 secured to the shaft 48 and having a spherical end 51 which is slidably and revolubly mounted within a cylindrical slot 52 within one end 53 of a block 54, the other end 55 of said block being bifurcated and pivotally mounted on the shaft 16 and held against sliding movement by means of collars 56 secured to the shaft 16. A ratchet wheel 57 is mounted on the shaft 16 between the bifurcations of the block 54 and a pawl 58 is pivotally secured to the end 65 of the block 54 by a pin 59, one end of said pawl engaging with the ratchet wheel 57 and the other end 61 being curved inwardly and engaged by a spring 62 secured to the block 54. Resultantly the crank 50 being offset from the shaft 48 and having its end 51 engaging in the end 53 of the block 54 the rotation of the shaft 48 will raise and lower the block 54 and consequently vertically reciprocate the shaft 16 to which it is connected and at the same time the crank 50 will give a rotary movement to the block 54, causing the pawl 58 to turn the ratchet 57 to rotate the shaft 16.

The means for continuously rotating the shaft 48 comprises a lever 63 pivotally secured at one end to a bracket 64 upon the machine and a lever 65 pivotally secured at one end intermediate the ends of the lever 63 and pivotally secured at its other end to the horizontally extending portion 66 of the crank 50 whereby the reciprocation of the lever 63 will rotate the shaft 48 and said shaft is operatively connected to a fly-wheel 67 mounted on a pin 68, secured in a bracket 69 upon the cover of the machine by a belt 70 connecting said fly-wheel with the wheel 70 mounted on the shaft 48. It is also to be noted that while the bracket 69 is secured to the hinged cover 14 of the machine the axis of rotation of the fly-wheel 67 is coincident with the pivotal connection of the cover and the machine whereby the cover is relieved of the weight of the fly-wheel should it be desired to raise the cover.

The means for vertically reciprocating and continuously rotating the shaft 16 shown in Fig. 9 is similar to that shown in Fig. 7 with the exception that instead of providing a crank for the shaft 48 the shaft 48' is bent at an angle from the point at which it is journaled in the bracket 49' and is provided at its bent end with a spherical portion 51' which similar to the spherical end 51 of the shaft 48 is slidable within the bracket 54 and the driving connection with this exception is similar to that previously described in connection with Figs. 6 to 8. The means continuously rotating the shaft 48' comprises levers 33 and 33' shown in Fig. 1, the lever 33 being eccentrically and pivotally mounted upon a gear 72 which is secured to the shaft 48' and which is in mesh with a gear 73 on the hub 7 of the fly-wheel 74 which is pivotally mounted upon the machine. Resultantly the bending of the machine 48' will cause its end 51' to move upwardly and downwardly in a circular path and consequently elevate and depress the bracket 54 and the shaft 16 and at the same time impart a rotary tendency to the bracket 54 and by the means previously described in discussing Figs. 7 and 8 continuously rotating the shaft 16.

The means for vertically reciprocating and continuously rotating the shaft 16 shown in Figs. 10 and 11 comprises a horizontal shaft 75 similar to the shaft 48 and similarly mounted in a bracket 76 upon the cover 14 of the machine, a driving connection between the shaft 75 and the shaft 16 to continuously rotate and vertically reciprocate said shaft 16, and means for continuously rotating the shaft 75.

A driving connection between the shaft 16 and the horizontal shaft 75 comprises an arm 77 which is secured to the end of the shaft 75 and which is provided with an aperture 78 having oppositely beveled sides 79 which are adapted to receive a square ended pin 80 which is journaled in a casing 81 pivotally secured to the shaft 16 by collars 82 which pin is provided with a worm gear 83 which meshes with a gear 84 secured to the shaft 16. Resultantly the rotation of the arm 77 will elevate and depress the pin and at the same time cause it to rotate within the casing 81 and consequently turn the shaft 16 through the worm wheel connection. The means for continuously rotating the shaft 75 is identical with that for continuously rotating the shaft 48' shown in Fig. 9.

The invention thus exemplifies a means for vertically reciprocating and continuously rotating the agitator shaft of the washing machine.

The invention is not to be restricted to the details of construction herein set forth but the construction may be varied so long as it is within the scope of appended claims.

What I claim as my invention is:—

1. In a washing machine, the combination of a vertical shaft, a shaft disposed at an angle thereto, a driving connection between said shafts comprising a wheel on the vertical shaft, means operatively connected to said angularly disposed shaft for continuously rotating said wheel, and mechanism including means integral with said angularly disposed shaft for vertically reciprocating the driving connection and the vertical shaft during the continuous rotation of said shafts.

2. In a washing machine, the combination of a vertical shaft, a shaft disposed at an angle thereto, a driving connection between said shafts comprising a wheel mounted on the vertical shaft, a member pivotally secured to said vertical shaft, and mechanism including means connected to said angularly disposed shaft and pivotally secured to said member for vertically reciprocating the driving connection and the vertical shaft during the continuous rotation of said shafts.

3. In a washing machine, the combination of a vertical shaft, a shaft disposed at an angle thereto, one of the ends of said angularly disposed shaft being out of alinement with the other, and a driving connection between said out of line end and said vertical shaft for continuously rotating said vertical shaft, the out of line end of said angularly disposed shaft causing said driving connection and vertical shaft to be vertically reciprocated during the continuous rotation of said shafts.

4. In a washing machine, the combination, with a vertical shaft, of a shaft disposed at an angle thereto, a driving connection between said shafts comprising a toothed wheel mounted on the vertical shaft, a member pivotally mounted on said vertical shaft adjacent said wheel, means pivotally carried by said member for engaging said wheel to continuously rotate the same, and means on said angularly disposed shaft for vertically reciprocating said driving connection and said vertical shaft during the continuous rotation of said shaft.

5. In a washing machine, the combination, with a vertical shaft, of a shaft disposed at an angle thereto, a driving connection between said shafts comprising a gearing connection between said shafts for continuously rotating said shafts, and means on said angularly disposed shaft for vertically reciprocating said driving connection and said vertical shaft during the continuous rotation of said angularly disposed shaft.

6. In a washing machine, the combination, with a vertical shaft, of a shaft disposed at an angle thereto, a driving connection between said shafts comprising a gear on the vertical shaft, a collar revolubly mounted on the vertical shaft, a gear carried by said angularly disposed shaft revolubly connected to said collar and in mesh with said gear on the vertical shaft whereby the vertical shaft will be continuously rotated during the rotation of said angularly disposed shaft, and eccentric means on said angularly disposed shaft for vertically reciprocating said driving connection and said vertical shaft during the continuous rotation of said angularly disposed shaft.

7. In a washing machine, the combination, with a vertical shaft, of a shaft disposed at an angle thereto, a driving connection between said shafts comprising a gearing connection between said shafts for continuously rotating said shafts, means operatively connected to said angularly disposed shaft for continuously driving the same, a universal joint connection between said driving means and said angularly disposed shaft, an apertured bracket, a cam on said angularly disposed shaft disposed within the aperture of said bracket, said cam and bracket coöperating to vertically reciprocate said angularly disposed shaft and the driving connection between the shafts whereby the vertical shaft will be reciprocated during its continuous rotation.

In testimony whereof, I affix my signature, in presence of two witnesses.

JOHN P. DORAU.

Witnesses:
 C. A. ROSSBACH,
 A. H. KEENEY.